United States Patent
Liu et al.

(10) Patent No.: US 9,668,254 B2
(45) Date of Patent: May 30, 2017

(54) METHOD AND DEVICE FOR SCRAMBLING SEQUENCE CONFIGURATION, USER EQUIPMENT, AND BASE STATION

(71) Applicant: Huawei Technologies Co., Ltd., Shenzhen (CN)

(72) Inventors: Jianqin Liu, Shenzhen (CN); Yongxing Zhou, Shenzhen (CN); Qiang Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 14/693,510

(22) Filed: Apr. 22, 2015

(65) Prior Publication Data

US 2015/0230216 A1    Aug. 13, 2015

Related U.S. Application Data

(63) Continuation of application No. PCT/CN2012/083856, filed on Oct. 31, 2012.

(51) Int. Cl.
*H04W 72/04* (2009.01)
*H04L 25/03* (2006.01)
(Continued)

(52) U.S. Cl.
CPC ......... *H04W 72/042* (2013.01); *H04L 5/0051* (2013.01); *H04L 5/0053* (2013.01);
(Continued)

(58) Field of Classification Search
CPC ..... H04L 5/003; H04L 5/0051; H04L 5/0053; H04L 25/03866; H04L 1/0045; H04W 72/042; H04W 88/02; H04W 88/08; H04J 11/0069; H04J 13/10
See application file for complete search history.

(56) References Cited

U.S. PATENT DOCUMENTS

2011/0077038 A1    3/2011   Montojo et al.
2011/0249640 A1   10/2011   Soong et al.
(Continued)

FOREIGN PATENT DOCUMENTS

CA    2 802 039 A1    12/2011
CN    102395206 A1    3/2012
(Continued)

OTHER PUBLICATIONS

Samsung, "Remaining DMRS Aspects for EPDCCH", Oct. 8-12, 2012, 3GPP TSG RAN WG1 #70bis, R1-124382, pp. 1-4.*
(Continued)

*Primary Examiner* — Paul H Masur
(74) *Attorney, Agent, or Firm* — Brinks Gilson & Lione

(57) ABSTRACT

A method and a device for scrambling sequence configuration, a user equipment and a base station are provided. The method includes: obtaining a search space and/or a transmission mode corresponding to an enhanced control channel; performing a scrambling initialization operation according to the search space and/or the transmission mode, and determining an initialization value of a scrambling sequence; determining the scrambling sequence according to the initialization value of the scrambling sequence; and scrambling a transmission signal transmitted by the enhanced control channel according to the scrambling sequence and then transmitting, so that a user equipment which receives the transmission signal performs a descrambling operation according to the scrambling sequence in the transmission signal. Randomization of interferences between different cells or terminals can be guaranteed as far as possible.

20 Claims, 3 Drawing Sheets

(51) Int. Cl.
*H04L 5/00* (2006.01)
*H04W 88/02* (2009.01)
*H04W 88/08* (2009.01)
*H04J 11/00* (2006.01)
*H04J 13/10* (2011.01)
*H04L 1/00* (2006.01)

(52) U.S. Cl.
CPC ..... *H04L 25/03866* (2013.01); *H04J 11/0069* (2013.01); *H04J 13/10* (2013.01); *H04L 1/0045* (2013.01); *H04W 88/02* (2013.01); *H04W 88/08* (2013.01)

(56) References Cited

U.S. PATENT DOCUMENTS

| | | | |
|---|---|---|---|
| 2013/0242904 A1* | 9/2013 | Sartori | H04L 5/0053 370/329 |
| 2013/0294366 A1* | 11/2013 | Papasakellariou | H04W 72/0406 370/329 |
| 2013/0294368 A1* | 11/2013 | Bendlin | H04W 72/042 370/329 |
| 2014/0079000 A1 | 3/2014 | Ko et al. | |
| 2014/0126487 A1* | 5/2014 | Chen | H04B 15/00 370/329 |
| 2014/0286297 A1 | 9/2014 | Zhao et al. | |

FOREIGN PATENT DOCUMENTS

| | | |
|---|---|---|
| EP | 2 683 098 A2 | 1/2014 |
| EP | 2 779 768 A1 | 9/2014 |
| WO | WO 2012/118269 A2 | 9/2012 |

OTHER PUBLICATIONS

Ericsson, "Mapping of ePDCCH to RE", Oct. 8-12, 2012, 3GPP TSG-RAN WG1 #70bis, R1-124149, pp. 1-6.*
ZTE, "Discussion on DMRS scrambling sequence for enhanced PDCCH", Oct. 8-12, 2012, R1-124208, pp. 1-3.*
Texas Instruments, "Scrambling Sequence Initialization of DMRS for ePDCCH," 3GPP TSG RAN WG1 #70, Qingdao, China, R1-123196, Aug. 2012, 3 pages.

* cited by examiner

METHOD AND DEVICE FOR SCRAMBLING SEQUENCE CONFIGURATION, USER EQUIPMENT, AND BASE STATION

CROSS-REFERENCE TO RELATED APPLICATIONS

This application is a continuation of International Application No. PCT/CN2012/083856, filed on Oct. 31, 2012, which is hereby incorporated by reference in its entirety.

TECHNICAL FIELD

The present invention relates to communication technologies and, in particular, to a method and a device for scrambling sequence configuration, a user equipment, and a base station.

BACKGROUND

With the rapid development of communication technologies, more and more users use a mobile terminal. An existing control channel can only use a transmission mode of a distributed mode where only one user is supported to perform information transmission at a same time-frequency resource position, which is far from meeting requirements. Hence, an enhanced physical downlink control channel (ePDCCH) occurs.

Different from the conventional control channel which only supports the transmission mode of the distributed mode, the enhanced control channel may support the transmission mode of the distributed mode and a transmission mode of a localized mode, where the enhanced control channel which employs the transmission mode of the localized mode is able to support multiple users to perform information transmission simultaneously on a same time-frequency resource position, the capacity and performance requirements of the control channel are greatly satisfied.

In order to distinguish between a user, a cell, a channel and information transmitted on the channel etc, a scrambling operation is performed to to-be-transmitted information usually, that is, using a scrambling sequence to scramble the to-be-transmitted information and then sending. Thus, the to-be-transmitted information needs to be scrambled when simultaneous transmission for multiple users at a same time-frequency resource position is supported or when multiple transmission modes are used for information transmission, that is, performing an initialization configuration to a scrambling sequence so as to determine the scrambling sequence and applying the scrambling sequence to the to-be-transmitted information so as to distinguish between a user, a cell, a channel and/or information transmitted on the channel, etc.

SUMMARY

Aspects of the present invention provide a method and a device for scrambling sequence configuration, a user equipment and a base station, which are used to determine a scrambling sequence so as to scramble transmission information.

In a first aspect, the present invention provides a method for scrambling sequence configuration, including:

obtaining a search space and/or a transmission mode corresponding to an enhanced control channel, where the search space includes a UE-specific search space and a common search space, and the transmission mode includes a localized mode and a distributed mode;

performing a scrambling initialization operation according to the search space and/or the transmission mode, and determining an initialization value of a scrambling sequence;

determining, according to the initialization value of the scrambling sequence, the scrambling sequence; and scrambling, according to the scrambling sequence, a transmission signal transmitted by the enhanced control channel and then transmitting, so that a user equipment which receives the transmission signal performs a descrambling operation according to the scrambling sequence in the transmission signal.

In a first possible implementation form according to the first aspect, the performing a scrambling initialization operation according to the search space and/or the transmission mode includes:

if the search space is the UE-specific search space, then performing a UE-specific scrambling initialization operation;

if the search space is the common search space, then performing a transmission point-specific scrambling initialization operation.

In a second possible implementation form according to the first possible implementation form, the determining an initialization value of a scrambling sequence includes:

determining, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

determining, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where, $n_{RNTI}$ indicates an associated radio network temporary identifier RNTI when the enhanced control channel transmits information, $n_s$ is a timeslot number, and $N_{ID}^{cell}$ is a physical cell identity ID or a virtual cell ID of a cell where the user equipment locates.

In a third possible implementation form according to the first aspect, the performing a scrambling initialization operation according to the search space and/or the transmission mode includes:

if the search space is the UE-specific search space or the common search space, then performing a transmission point-specific initialization operation.

In a fourth possible implementation form according to the third possible implementation form, the determining an initialization value of a scrambling sequence includes:

determining, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated radio network temporary identifier RNTI during enhanced control channel transmission, $n_s$ is a timeslot number, and $N_{ID}^{cell}$ is a physical cell ID or a virtual cell ID of a cell where the user equipment locates.

In a fifth possible implementation form according to the first aspect, the performing a scrambling initialization operation according to the search space and/or the transmission mode includes:

if the transmission mode is the localized mode, then performing a UE-specific scrambling initialization operation;

if the transmission mode is the distributed mode, then performing a transmission point-specific scrambling initialization operation.

In a sixth possible implementation form according to the fifth possible implementation form, the determining an initialization value of a scrambling sequence includes:

determining, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell}+1) \cdot 2^{16} + n_{RNTI}$;

determining, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell}+1) \cdot 2^{16} + n_{RNTI}$;

where, $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a seventh possible implementation form according to the first aspect, the performing a scrambling initialization operation according to the search space and/or the transmission mode includes:

if the transmission mode is the localized mode or the distributed mode, then performing a UE-specific scrambling initialization operation; or if the transmission mode is the localized mode or the distributed mode, then performing a transmission point-specific scrambling initialization operation.

In an eighth possible implementation form according to the seventh possible implementation form, the determining an initialization value of a scrambling sequence includes:

determining, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell}+1) \cdot 2^{16} + n_{RNTI}$;

determining, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell}+1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a ninth possible implementation form according to the first aspect, the performing a scrambling initialization operation according to the search space and/or the transmission mode includes:

if the search space is the UE-specific search space and the transmission mode is the localized mode, then performing a UE-specific scrambling initialization operation;

if the search space is the UE-specific search space and the transmission mode is the distributed mode, then performing a transmission point-specific scrambling initialization operation.

In a tenth possible implementation form according to the ninth possible implementation form, the determining an initialization value of a scrambling sequence includes:

determining, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell}+1) \cdot 2^{16} + n_{RNTI}$;

determining, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell}+1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In an eleventh possible implementation form according to the first aspect, the performing a scrambling initialization operation according to the search space and/or the transmission mode includes:

if the search space is the common search space and the transmission mode is the localized mode, then performing a UE-specific scrambling initialization operation;

if the search space is the common search space and the transmission mode is the distributed mode, then performing a transmission point-specific scrambling initialization operation.

In a twelfth possible implementation form according to the eleventh possible implementation form, the determining an initialization value of a scrambling sequence includes:

determining, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell}+1) \cdot 2^{16} + n_{RNTI}$;

determining, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell}+1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a thirteenth possible implementation form according to the second possible implementation form, or the fourth possible implementation form, or the sixth possible implementation form, or the eighth possible implementation form, or the tenth possible implementation form, or the twelfth possible implementation form, the virtual cell ID is a virtual cell ID in initialization setting of a demodulation reference signal DMRS sequence of the enhanced control channel, or is a virtual cell ID in initialization setting of a DMRS sequence of a physical downlink shared channel, or is other value which is configured by a higher layer signaling and is dedicated for the enhanced control channel.

In a fourteenth possible implementation form according to the first aspect, or the first possible implementation form to the thirteenth possible implementation form, the transmission mode supported by the enhanced control channel in the UE-specific search space includes the localized mode and the distributed mode;

the transmission mode supported by the enhanced control channel in the common search space includes the localized mode and the distributed mode; or the transmission mode supported by the enhanced control channel in the common search space includes the distributed mode.

In a second aspect, the present invention provides a method for scrambling sequence configuration, including:

when a user equipment receives a transmission signal sent by a base station via an enhanced control channel, obtaining a search space and/or a transmission mode corresponding to the enhanced control channel, where the search space includes a UE-specific search space and a common search space, and the transmission mode includes a localized mode and a distributed mode;

performing a scrambling initialization operation according to the search space and/or the transmission mode, and determining an initialization value of a scrambling sequence;

determining the scrambling sequence according to the initialization value of the scrambling sequence; and performing a descrambling operation to the transmission signal according to the scrambling sequence, and obtaining information in the transmission signal.

In a first possible implementation form according to the second aspect, the performing a scrambling initialization operation according to the search space and/or the transmission mode includes:

if the search space is the UE-specific search space, then performing a UE-specific scrambling initialization operation;

if the search space is the common search space, then performing a transmission point-specific scrambling initialization operation.

In a second possible implementation form according to the first possible implementation form, the determining an initialization value of a scrambling sequence includes:

determining, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

determining, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ indicates an associated radio network temporary identifier RNTI when the enhanced control channel transmits information, $n_s$ is a timeslot number, and $N_{ID}^{cell}$ is a physical cell identity ID or a virtual cell ID of a cell where the user equipment locates.

In a third possible implementation form according to the second aspect, the performing a scrambling initialization operation according to the search space and/or the transmission mode includes:

if the search space is the UE-specific search space or the common search space, then performing a transmission point-specific initialization operation.

In a fourth possible implementation form according to the third possible implementation form, the determining an initialization value of a scrambling sequence includes:

determining the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated radio network temporary identifier RNTI during enhanced control channel transmission, $n_s$ is a timeslot number, and $N_{ID}^{cell}$ is a physical cell ID or a virtual cell ID of a cell where the user equipment locates.

In a fifth possible implementation form according to the second aspect, the performing a scrambling initialization operation according to the search space and/or the transmission mode includes:

if the transmission mode is the localized mode, then performing a UE-specific scrambling initialization operation;

if the transmission mode is the distributed mode, then performing a transmission point-specific scrambling initialization operation.

In a sixth possible implementation form according to the fifth possible implementation form, the determining an initialization value of a scrambling sequence includes:

determining, according to the UE-specific scrambling initialization operation, the initialization value $c_{init}$ of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

determining, according to the transmission point-specific scrambling initialization operation, the initialization value $c_{init}$ of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a seventh possible implementation form according to the second aspect, the performing a scrambling initialization operation according to the search space and/or the transmission mode includes:

if the transmission mode is the localized mode or the distributed mode, then performing a UE-specific scrambling initialization operation; or if the transmission mode is the localized mode or the distributed mode, then performing a transmission point-specific scrambling initialization operation.

In an eighth possible implementation form according to the seventh possible implementation form, the determining an initialization value of a scrambling sequence includes:

determining, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

determining, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a ninth possible implementation form according to the second aspect, the performing a scrambling initialization operation according to the search space and/or the transmission mode includes:

if the search space is the UE-specific search space and the transmission mode is the localized mode, then performing a UE-specific scrambling initialization operation;

if the search space is the UE-specific search space and the transmission mode is the distributed mode, then performing a transmission point-specific scrambling initialization operation.

In a tenth possible implementation form according to the ninth possible implementation form, the determining an initialization value of a scrambling sequence includes:

determining, according to the UE-specific scrambling initialization operation, the initialization value $c_{init}$ of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

determining, according to the transmission point-specific scrambling initialization operation, the initialization value $c_{init}$ of the scrambling sequence as $\lfloor n_s/2 \rfloor 2^9 + N_{ID}^{cell}$; $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In an eleventh possible implementation form according to the second aspect, the performing a scrambling initialization operation according to the search space and/or the transmission mode includes:

if the search space is the common search space and the transmission mode is the localized mode, then performing a UE-specific scrambling initialization operation;

if the search space is the common search space and the transmission mode is the distributed mode, then performing a transmission point-specific scrambling initialization operation.

In a twelfth possible implementation form according to the eleventh possible implementation form, the determining an initialization value of a scrambling sequence includes:

determining, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

determining, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during the enhanced control channel transmission, $n_s$ is a timeslot number, and $N_{ID}^{cell}$ is a physical cell ID or a virtual cell ID of a cell where the user equipment locates.

In a thirteenth possible implementation form according to the second possible implementation form, or the fourth possible implementation form, or the sixth possible implementation form, or the eighth possible implementation form, or the tenth possible implementation form, or the twelfth possible implementation form, the virtual cell ID is a virtual cell ID in initialization setting of a demodulation reference signal DMRS sequence of the enhanced control channel, or is a virtual cell ID in initialization setting of a DMRS sequence of a physical downlink shared channel, or is other value which is configured by a higher layer signaling and is dedicated for the enhanced control channel.

In a fourteenth possible implementation form according to the first aspect or the first possible implementation form to the thirteenth possible implementation form, the transmission mode supported by the enhanced control channel in the UE-specific search space includes the localized mode and the distributed mode;

the transmission mode supported by the enhanced control channel in the common search space includes the localized mode and the distributed mode; or the transmission mode supported by the enhanced control channel in the common search space includes the distributed mode.

In a third aspect, the present invention provides a device for scrambling sequence configuration, including:

a first obtaining module, configured to obtain a search space and/or a transmission mode corresponding to an enhanced control channel, where the search space includes a UE-specific search space and a common search space, and the transmission mode includes a localized mode and a distributed mode;

a first determining module, configured to perform a scrambling initialization operation according to the search space and/or the transmission mode, and determine an initialization value of a scrambling sequence;

a second determining module, configured to determine the scrambling sequence according to the initialization value of the scrambling sequence; and a transmitting module, configured to scramble, according to the scrambling sequence, a transmission signal transmitted by the enhanced control channel and then transmit, so that a user equipment which receives the transmission signal performs a descrambling operation according to the scrambling sequence in the transmission signal.

In a first possible implementation form according to the third aspect, the first determining module is specifically configured to:

if the search space is the UE-specific search space, then perform a UE-specific scrambling initialization operation, and determine the initialization value of the scrambling sequence;

if the search space is the common search space, then perform a transmission point-specific scrambling initialization operation, and determine the initialization value of the scrambling sequence.

In a second possible implementation form according to the first possible implementation form, the first determining module is specifically configured to:

if the search space is the UE-specific search space, determine, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

if the search space is the common search space, determine, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ indicates an associated radio network temporary identifier RNTI when the enhanced control channel transmits information, $n_s$ is a timeslot number, and $N_{ID}^{cell}$ is a physical cell identity ID or a virtual cell ID of a cell where the user equipment locates.

In a third possible implementation form according to the third aspect, the first determining module is specifically configured to:

if the search space is the UE-specific search space or the common search space, then perform a transmission point-specific initialization operation, and determine the initialization value of the scrambling sequence.

In a fourth possible implementation form according to the third possible implementation form, the first determining module is specifically configured to:

if the search space is the UE-specific search space or the common search space, then perform a transmission point-specific initialization operation, and determine the initialization value $c_{init}$ of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated radio network temporary identifier RNTI during the enhanced control channel transmission, $n_s$ is a timeslot number, and $N_{ID}^{cell}$ is a physical cell ID or a virtual cell ID of a cell where the user equipment locates.

In a fifth possible implementation form according to the third aspect, the first determining module is specifically configured to:

if the transmission mode is the localized mode, then perform a UE-specific scrambling initialization operation, and determine the initialization value of the scrambling sequence;

if the transmission mode is the distributed mode, then perform a transmission point-specific scrambling initialization operation, and determine the initialization value of the scrambling sequence.

In a sixth possible implementation form according to the fifth possible implementation form, the first determining module is specifically configured to:

if the transmission mode is the localized mode, determine, according to the UE-specific scrambling initialization operation, the initialization value $c_{init}$ of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

if the transmission mode is the distributed mode, determine, according to the transmission point-specific scrambling initialization operation, the initialization value $c_{init}$ of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a seventh possible implementation form according to the third aspect, the first determining module is specifically configured to:

if the transmission mode is the localized mode or the distributed mode, then perform a UE-specific scrambling initialization operation, and determine the initialization value of the scrambling sequence; or if the transmission mode is the localized mode or the distributed mode, then perform a transmission point-specific scrambling initialization operation, and determine the initialization value of the scrambling sequence.

In an eighth possible implementation form according to the seventh possible implementation form, the first determining module is specifically configured to:

if the transmission mode is the localized mode or the distributed mode, determine, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

if the transmission mode is the localized mode or the distributed mode, determine, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a ninth possible implementation form according to the third aspect, the first determining module is specifically configured to:

if the search space is the UE-specific search space and the transmission mode is the localized mode, then perform a UE-specific scrambling initialization operation;

if the search space is the UE-specific search space and the transmission mode is the distributed mode, then perform a transmission point-specific scrambling initialization operation.

In a tenth possible implementation form according to the ninth possible implementation, the first determining module is specifically configured to:

if the search space is the UE-specific search space and the transmission mode is the localized mode, determine, according to the UE-specific scrambling initialization method, the initialization value $c_{init}$ of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

if the search space is the UE-specific search space and the transmission mode is the distributed mode, determine, according to the transmission point-specific scrambling initialization operation, the initialization value $c_{init}$ of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In an eleventh possible implementation form according to the third aspect, the first determining module is specifically configured to:

if the search space is the common search space and the transmission mode is the localized mode, then perform a UE-specific scrambling initialization operation;

if the search space is the common search space and the transmission mode is the distributed mode, then perform a transmission point-specific scrambling initialization operation.

In a twelfth possible implementation form according to the eleventh possible implementation form, the first determining module is specifically configured to:

if the search space is the common search space and the transmission mode is the localized mode, determine, according to the UE-specific scrambling initialization operation, the initialization value $c_{init}$ of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

if the search space is the common search space and the transmission mode is the distributed mode, determine, according to the transmission point-specific scrambling initialization operation, the initialization value $c_{init}$ of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a fourth aspect, the present invention provides a user equipment, including:

a second obtaining module, configured to obtain a search space and/or a transmission mode corresponding to an enhanced control channel when the user equipment receives a transmission signal transmitted by a base station via the enhanced control channel, where the search space includes a UE-specific search space and a common search space, and the transmission mode includes a localized mode and a distributed mode;

a third determining module, configured to perform a scrambling initialization operation according to the search space and/or the transmission mode, and determine an initialization value of a scrambling sequence;

a fourth determining module, configured to determine the scrambling sequence according to the initialization value of the scrambling sequence; and a descrambling module, configured to perform a descrambling operation to a scrambling sequence in the transmission signal according to the scrambling sequence.

In an eleventh possible implementation form according to the fourth aspect, the third determining module is specifically configured to:

if the search space is the UE-specific search space, then perform a UE-specific scrambling initialization operation, and determine the initialization value of the scrambling sequence;

if the search space is the common search space, then perform a transmission point-specific scrambling initialization operation, and determine the initialization value of the scrambling sequence.

In a second possible implementation form according to the first possible implementation form, the third determining module is specifically configured to:

if the search space is the UE-specific search space, determine, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (\lfloor n_s/2 \rfloor + 1) \cdot 2^{16} + n_{RNTI}$;

if the search space is the common search space, determine, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ indicates an associated radio network temporary identifier RNTI when the enhanced control channel transmits information, $n_s$ is a timeslot number, and $N_{ID}^{cell}$ is a physical cell identity ID or a virtual cell ID of a cell where the user equipment locates.

In a third possible implementation form according to the fourth aspect, the third determining module is specifically configured to:

if the search space is the UE-specific search space or the common search space, then perform a transmission point-specific initialization operation, and determine the initialization value of the scrambling sequence.

In a fourth possible implementation form according to the third possible implementation form, the third determining module is specifically configured to:

if the search space is the UE-specific search space or the common search space, determine the initialization value $c_{init}$ of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated radio network temporary identifier RNTI during enhanced control channel transmission, $n_s$ is a timeslot number, and $N_{ID}^{cell}$ is a physical cell ID or a virtual cell ID of a cell where the user equipment locates.

In a fifth possible implementation form according to the fourth aspect, the third determining module is specifically configured to:

if the transmission mode is the localized mode, then perform a UE-specific scrambling initialization operation, and determine the initialization value of the scrambling sequence;

if the transmission mode is the distributed mode, then perform a transmission point-specific scrambling initialization operation, and determine the initialization value of the scrambling sequence.

In a sixth possible implementation form according to the fifth possible implementation form, the third determining module is specifically configured to:

if the transmission mode is the localized mode, determine, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

if the transmission mode is the distributed mode, determine, according to the transmission point-specific scrambling initialization operation, the initialization value of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a seventh possible implementation form according to the fourth aspect, the third determining module is specifically configured to:

if the transmission mode is the localized mode or the distributed mode, then perform a UE-specific scrambling initialization operation, and determine the initialization value of the scrambling sequence; or if the transmission mode is the localized mode or the distributed mode, then perform a transmission point-specific scrambling initialization operation, and determine the initialization value of the scrambling sequence.

In an eighth possible implementation form according to the seventh possible implementation form, the third determining module is specifically configured to:

if the transmission mode is the localized mode or the distributed mode, determine, according to the UE-specific scrambling initialization operation, the initialization value $c_{init}$ of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$; or if the transmission mode is the localized mode or the distributed mode, determine, according to the transmission point-specific scrambling initialization operation, the initialization value $c_{init}$ of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a ninth possible implementation form according to the fourth aspect, the third determining module is specifically configured to:

if the search space is the UE-specific search space and the transmission mode is the localized mode, then perform a UE-specific scrambling initialization operation;

if the search space is the UE-specific search space and the transmission mode is the distributed mode, then perform a transmission point-specific scrambling initialization operation.

In a tenth possible implementation form according to the ninth possible implementation form, the third determining module is specifically configured to:

if the search space is the UE-specific search space and the transmission mode is the localized mode, determine, according to the UE-specific scrambling initialization operation, the initialization value $c_{init}$ of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

if the search space is the UE-specific search space and the transmission mode is the distributed mode, determine, according to the transmission point-specific scrambling initialization operation, the initialization value $c_{init}$ of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In an eleventh possible implementation form according to the fourth aspect, the third determining module is specifically configured to:

if the search space is the common search space and the transmission mode is the localized mode, then perform a UE-specific scrambling initialization operation;

if the search space is the common search space and the transmission mode is the distributed mode, then perform a transmission point-specific scrambling initialization operation.

In a twelfth possible implementation form according to the eleventh possible implementation form, the third determining module is specifically configured to:

if the search space is the common search space and the transmission mode is the localized mode, determine, according to the UE-specific scrambling initialization operation, the initialization value $c_{init}$ of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

if the search space is the common search space and the transmission mode is the distributed mode, determine, according to the transmission point-specific scrambling initialization operation, the initialization value $c_{init}$ of the scrambling sequence as $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

where $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

In a fifth aspect, the present invention provides a base station, including: at least one processor and a memory, where the memory is configured to store an executable program code, and, by reading the executable program code stored in the memory to run a program corresponding to the executable program code, the processor is configured to:

obtain a search space and/or a transmission mode corresponding to an enhanced control channel, where the search space includes a UE-specific search space and a common search space, and the transmission mode includes a localized mode and a distributed mode;

perform a scrambling initialization operation according to the search space and/or the transmission mode, and determine an initialization value of a scrambling sequence;

determine the scrambling sequence according to the initialization value of the scrambling sequence; and scramble, according to the scrambling sequence, a transmission signal transmitted by the enhanced control channel and then transmit, so that a user equipment which receives the transmission signal performs a descrambling operation according to the scrambling sequence in the transmission signal.

In a sixth aspect, the present invention provides a user equipment, including: at least one processor and a memory, where the memory is configured to store an executable program code, and, by reading the executable program code stored in the memory to run a program corresponding to the executable program code, the processor is configured to:

when the user equipment receives a transmission signal transmitted by a base station via an enhanced control channel, obtain a search space and/or a transmission mode corresponding to the enhanced control channel, where the search space includes a UE-specific search space and a common search space, and the transmission mode includes a localized mode and a distributed mode;

perform a scrambling initialization operation according to the search space and/or the transmission mode, and determine an initialization value of a scrambling sequence;

determine the scrambling sequence according to the initialization value of the scrambling sequence; and perform a descrambling operation to a scrambling sequence in the transmission signal according to the scrambling sequence.

According to the method and the device for scrambling sequence configuration, the user equipment and the base station of the present invention, the base station or the user equipment determines an initialization value of a scrambling sequence according to a search space or a transmission mode, or the base station or the user equipment determines the initialization value of the scrambling sequence according to both the search space and the transmission mode, which is able to guarantee randomization of interferences between different cells or terminals as far as possible, and meanwhile may be used to make a distinction between channels and/or regions where the channels locate.

BRIEF DESCRIPTION OF DRAWINGS

In order to make technical solutions in embodiments of the present invention or the prior art more clearly, accompanying drawings used for description of the embodiments or the prior art will be briefly described hereunder. Obviously, the following described drawings are merely some embodiments of present invention. For persons skilled in the art, other drawings may be obtained based on these drawings without any creative efforts.

DESCRIPTION OF EMBODIMENTS

In order to make objectives, technical solutions, and advantages of embodiments of the present invention more clearly, the technical solutions in embodiments of the present invention will be hereinafter described clearly and comprehensively with reference to accompanying drawings in embodiments of the present invention. Obviously, the described embodiments are only a part of embodiments of the present invention, rather than all embodiments of the present invention. All other embodiments obtained by persons of ordinary skill in the art based on the embodiments of the present invention without any creative efforts shall fall within the protection scope of the present invention.

Embodiment 1

Figure 1:
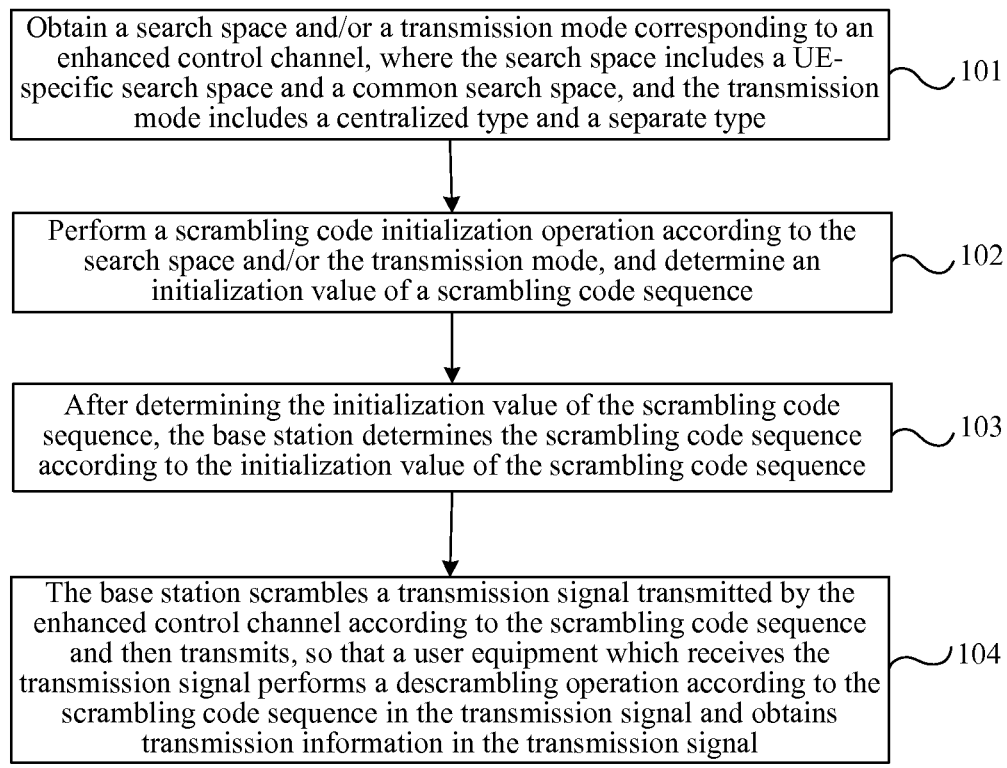
FIG. 1 is a schematic flow chart of a method for scrambling sequence configuration according to an embodiment of the present invention.

FIG. 1 is a schematic flow chart of a method for scrambling sequence configuration according to this embodiment. The method for scrambling sequence configuration according to this embodiment applies to a case where a base station and a terminal use an enhanced control channel to perform information transmission. An execution body of this embodiment is the base station. Regions of the enhanced control channel are divided into a common (Common) search space and a user equipment specific (UE-specific) search space, that is, a same enhanced control channel may only correspond to the common search space or the UE-specific search space, and may also correspond to both the common search space and the UE-specific search space. Both the common search space and the UE-specific search space may employ a transmission mode of a localized mode and a transmission mode of a distributed mode, or it may be that the common search space only supports the transmission mode of the distributed mode, and the UE-specific search space may support the transmission mode of the localized mode and the transmission mode of the distributed mode. The user equipment of this embodiment may be a mobile terminal.

Step 101, obtain a search space and/or a transmission mode corresponding to an enhanced control channel, where the search space includes a UE-specific search space and a common search space, and the transmission mode includes a localized mode and a distributed mode.

The enhanced control channel is different from a traditional control channel which only supports the transmission mode of the distributed mode, and it can support the transmission mode of the distributed mode and the transmission mode of the localized mode. The UE-specific search space is used to transmit a scheduling indication signaling for uplink and downlink information transmission of a user, and the common search space is used to transmit a scheduling indication signaling of common control information, the common control information is, for example, a system broadcast message, a paging message and a random access message. The transmission mode of the localized mode refers to that one enhanced control channel element (eCCE) of an enhanced control channel performs information transmission only in one physical resource block pair (PRB pair), and the transmission mode of the distributed mode refers to that one enhanced control channel element of an enhanced control channel transmits information in several PRB pairs which are inconsecutive over time-frequency to obtain frequency diversity gain. The enhanced control channel and its corresponding search space and transmission mode are the prior art, which will not be repeated herein.

Before determining an initialization value of a scrambling sequence, the base station needs to obtain a search space and/or a transmission mode corresponding to the enhanced control channel firstly. The scrambling sequence is a sequence including a series of scrambling numbers; the determining of the initialization value of the scrambling sequence is for the purpose of determining a determined value of the scrambling sequence.

Step 102, perform a scrambling initialization operation according to the search space and/or the transmission mode, and determine an initialization value of a scrambling sequence.

In the above method, both the scrambling manner and the manner for generating the initial scrambling sequence are manners in the prior art. For instance, scrambling is performed by using the formula (1) as follows.

$$\tilde{b}(i)=(b(i)+c(i)) \bmod 2 \quad (1)$$

where b(i) is a signal bit transmitted by the enhanced control channel, c(i) is a scrambling sequence, and mod represents modulo. Generation of the scrambling sequence c(i) belongs to the prior art, which will not be repeated herein. At this time, the initialization value of the scrambling sequence is $$c_{init}=\lfloor n_s/2 \rfloor 2^9 + N_{ID}^{cell}$$

where $n_s$ is a timeslot number (Timeslot), and $N_{ID}^{cell}$ represents an identification of a cell where the user equipment locates. The symbol $\lfloor \ \rfloor$ in this embodiment and all the embodiments hereunder represents round down.

Step 103, after determining the initialization value of the scrambling sequence, the base station determines the scrambling sequence according to the initialization value of the scrambling sequence.

Step 104, the base station scrambles a transmission signal transmitted through the enhanced control channel according to the scrambling sequence and then transmits, so that a user equipment which receives the transmission signal performs a descrambling operation according to the scrambling sequence in the transmission signal and obtains transmission information in the transmission signal.

It should be noted that, the initialization operation of the scrambling sequence according to this embodiment is performed when each subframe is initialized.

According to the method for scrambling sequence configuration in this embodiment, a base station determines an initialization value of a scrambling sequence according to a search space or a transmission mode, or the base station determines the initialization value of the scrambling sequence according to both the search space and the transmission mode, which is able to guarantee randomization of interference between different cells or terminals as far as possible, and meanwhile may be used to make a distinction between channels and/or regions where the channels locate.

For instance, in a carrier aggregation scenario, when a time-frequency resource position of an enhanced control channel corresponding to a common search space without a carrier indicator field (CIF) is the same as a time-frequency resource position of an enhanced control channel corresponding to a UE-specific search space with a carrier indicator field, and meanwhile effective payloads (payload) of both control channels are right equal, a terminal may distinguish the enhanced control channel from which the received information comes according to the different scrambling sequences (i.e. the different initialization values of the scrambling sequences) of the enhanced control channels of the common search space and the UE-specific search space. Additionally, when multiple users transmit information on a same time-frequency resource position simultaneously, and effective payloads of the enhanced control channels of these users are right equal, the different scrambling sequences (i.e. different initialization values of scrambling sequences) may be used for the enhanced control channels of these users to distinguish between different users that transmit information simultaneously on the same time-frequency resource position.

Embodiment 2

This embodiment is a specific embodiment on the basis of the embodiment 1, where a base station determines an initialization value of a scrambling sequence only based on a search space.

In this embodiment, if the search space is the UE-specific search space, then the base station performs a UE-specific scrambling initialization operation. An initialization value of a scrambling sequence is usually associated with at least one of a certain parameter specific to a user equipment, such as a radio network temporary identifier (RNTI), a timeslot number of enhanced control channel transmission and a certain parameter specific to a transmission point, such as a transmission point identity (ID), etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell}+1) \cdot 2^{16} + n_{RNTI}$.

If the search space is the common search space, then the base station performs a transmission point-specific scrambling initialization operation. An initialization value of a scrambling sequence is usually associated with at least one of a timeslot number of enhanced control channel transmission, an associated RNTI during enhanced control channel transmission and a certain parameter specific to a transmission point (such as a transmission point ID), etc. Specifically, the initialization value $c_{init}$ of the scrambling sequence, which is determined according to the transmission point-specific scrambling initialization operation, is $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ is an identification assigned by the base station to the user equipment, which corresponds to the associated RNTI when the enhanced control channel transmits information, $n_s$ is the timeslot number, and $N_{ID}^{cell}$ is an identification of a cell where the user equipment locates, which may be a physical cell identity (ID) or a virtual cell ID configured by a higher layer signaling, the higher layer signaling herein may be a radio resource control (RRC) signaling.

$n_s$ and $N_{ID}^{cell}$ (when corresponding to the physical cell ID) can be obtained immediately after the user equipment completes cell search and interpretation of physical broadcast channel (PBCH) information, the RNTI is obtained after the user equipment gets access to a network randomly, $N_{ID}^{cell}$ (when corresponding to the virtual cell ID) is configured and issued by a higher layer signaling after a random access of the user equipment, a specific method for obtaining these parameters belongs to prior art and will not be repeated herein. The higher layer signaling herein may be an RRC.

It should be noted that, there may be the following two options for $N_{ID}^{cell}$: one is that, before or after a random access of the user equipment, $N_{ID}^{cell}$ is a physical cell ID; the other is that, before a random access of the user equipment, $N_{ID}^{cell}$ is a physical cell ID, and after the random access of the user equipment, $N_{ID}^{cell}$ is a virtual cell ID, this virtual cell ID may be the same as a virtual cell ID during initialization of a demodulation reference signal (DMRS) scrambling sequence of a physical downlink shared channel (PDSCH), and may also be the same as a virtual cell ID of a DMRS scrambling sequence of the enhanced control channel, and additionally, may also be a value which is configured by a higher layer signaling semi-statically or dynamically and is dedicated for the enhanced control channel.

The UE-specific scrambling initialization refers to that initial generation of the scrambling depends on a certain parameter of the user equipment, such as a cell radio network temporary identifier (C-RNTI) etc, while the transmission point-specific initialization refers to that initial generation of the scrambling depends on a certain parameter of the transmission point, such as a cell identification, etc.

Embodiment 3

This embodiment provides a specific embodiment on the basis of the embodiment 1, where a base station determines an initialization value of a scrambling sequence only based on a search space.

In this embodiment, if the search space is a UE-specific search space or a common search space, then the base station performs a transmission point-specific initialization operation. Specifically, the initialization value $c_{init}$ of the scrambling sequence, which is determined according to the transmission point-specific initialization operation, is $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$, where, $n_{RNTI}$ corresponds to an associated radio network temporary identifier RNTI during enhanced control channel transmission, $n_s$ is a timeslot number, and $N_{ID}^{cell}$ is an identification of a cell where the user equipment locates, the identification of the cell may be a physical cell ID or a virtual cell ID, this virtual cell ID may be a virtual cell ID configured by a higher layer signaling. Obtaining of the parameters above is consistent with the manner of the embodiment 2, which will not be repeated herein.

Different from the embodiment 2, in this embodiment, initialization values of the scrambling sequences for the UE-specific search space and the common search space are the same.

It should be noted that, there may be the following two options for $N_{ID}^{cell}$: one is that, before or after a random access of the user equipment, $N_{ID}^{cell}$ is a physical cell ID; the other is that, before a random access of the user equipment, $N_{ID}^{cell}$ is a physical cell ID, and after the random access of the user equipment, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 4

This embodiment is a specific embodiment on the basis of the embodiment 1, where a base station determines an initialization value of a scrambling sequence only based on a transmission mode.

In this embodiment, determining, by a base station, an initialization value of a scrambling sequence according to a transmission mode includes:

If the transmission mode is a localized mode, then perform a UE-specific scrambling initialization operation. An initialization value of a scrambling sequence is usually associated with at least one of a certain parameter specific to a user equipment (such as an RNTI), a timeslot number of enhanced control channel transmission and a parameter specific to a transmission point (such as a transmission point identification ID) etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the transmission mode is a distributed mode, then perform a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID) etc. Specifically, the initialization value $c_{init}$ of the scrambling sequence, which is determined according to the transmission point-specific scrambling initialization operation, is $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is a timeslot number, and $N_{ID}^{cell}$ is an identification of a cell where the user equipment locates, the identification of the cell may be a physical cell ID or a virtual cell ID, where this virtual cell ID may be a virtual cell ID configured by a higher layer signaling.

It should be noted that, there may be the following two options for $N_{ID}^{cell}$: one is that, before or after a random access of the user equipment, $N_{ID}^{cell}$ is a physical cell ID; the other is that, before a random access of the user equipment, $N_{ID}^{cell}$ is a physical cell ID, and after the random access of the user equipment, $N_{ID}^{cell}$ is a virtual cell ID, where this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 5

This embodiment provides a specific embodiment on the basis of the embodiment 1, where an initialization value of a scrambling sequence is determined only based on a transmission mode.

If the transmission mode is a localized mode or a distributed mode, then the base station performs a UE-specific scrambling initialization operation. An initialization value of a scrambling sequence is usually associated with at least one of a certain parameter specific to a user equipment (such as an RNTI), a timeslot number of enhanced control channel transmission and a certain parameter specific to a transmission point (such as a transmission point identification ID) etc. Specifically, the initialization value $c_{init}$ of the scrambling sequence, which is determined according to the UE-specific scrambling initialization operation is $n_{RNTI} \cdot 2^{14} + \lfloor n_s/2 \rfloor \cdot 2^9 + N_{ID}^{cell}$ or $(\lfloor n_s/2 \rfloor + 1) \cdot (2 N_{ID}^{cell} + 1) \cdot 2^{16} + n_{RNTI}$.

If the transmission mode is the localized mode or the distributed mode, then the base station performs a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID) etc. Specifically, the initialization value $c_{init}$ of the scrambling sequence is $\lfloor n_s/2 \rfloor 2^9 + N_{ID}^{cell}$, $n_{RNTI} \cdot 2^{14} + \lfloor n_s/2 \rfloor \cdot 2^9 N_{ID}^{cell}$ or $(\lfloor n_s/2 \rfloor + 1) \cdot (2 N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment locates, which may be a physical cell ID or a virtual cell ID of a cell where the user equipment locates, and this virtual cell ID may be a virtual cell ID configured by a higher layer signaling.

This embodiment differs from the embodiment 4 in that, whether the transmission mode is the localized mode or the distributed mode, the base station will use a same initialization value of the scrambling sequence.

Embodiment 6

This embodiment provides a specific embodiment on the basis of the embodiment 1, where an initialization value of a scrambling sequence is determined by a base station based on a search space and a transmission mode.

Optionally, determining an initialization value of a scrambling sequence according to a search space and a transmission mode includes:

If the search space is a UE-specific search space and the transmission mode is a localized mode, then the base station performs a UE-specific scrambling initialization operation. The initialization value of the scrambling sequence is usually associated with at least one of a certain parameter specific to a user equipment (such as an RNTI), a timeslot number of enhanced control channel transmission and a certain parameter specific to a transmission point (such as a transmission point identification ID) etc. Specifically, the initialization value $c_{init}$ of the scrambling sequence is $n_{RNTI} \cdot 2^{14} + \lfloor n_s/2 \rfloor \cdot 2^9 + N_{ID}^{cell}$ or $(\lfloor n_s/2 \rfloor + 1) \cdot (2 N_{ID}^{cell} + 1) \cdot 2^{16} + n_{RNTI}$.

If the search space is the UE-specific search space and the transmission mode is a distributed mode, then the base station performs a transmission point-specific scrambling initialization operation. The initialization value of the scrambling sequence is usually associated with at least one of a timeslot number of the enhanced control channel transmission, an associated RNTI during the enhanced control channel transmission and a certain parameter specific to a transmission point (such as a transmission point ID) etc. Specifically, the initialization value $c_{init}$ of the scrambling sequence is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2 N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment locates, which may be a physical cell ID or a virtual cell ID, where this virtual cell ID may be a virtual cell ID configured by a higher layer signaling.

Optionally, determining an initialization value of a scrambling sequence according to a search space and a transmission mode includes:

If the search space is a common search space and the transmission mode is a localized mode, then perform a UE-specific scrambling initialization operation. The initialization value of the scrambling sequence is usually associated with at least one of a certain parameter specific to user equipment (such as an RNTI), a timeslot number of enhanced control channel transmission and a certain parameter specific to a transmission point (such as a transmission point identification ID) etc. Specifically, the initialization value $c_{init}$ of the scrambling sequence is $n_{RNTI} \cdot 2^{14} + \lfloor n_s/2 \rfloor \cdot 2^9 + N_{ID}^{cell}$ or $(\lfloor n_s/2 \rfloor + 1) \cdot (2 N_{ID}^{cell} + 1) \cdot 2^{16} + n_{RNTI}$.

If the search space is the common search space and the transmission mode is a distributed mode, then perform a transmission point-specific scrambling initialization operation. The initialization value of the scrambling sequence is usually associated with at least one of a timeslot number of the enhanced control channel transmission, an associated RNTI during the enhanced control channel transmission and a certain parameter specific to a transmission point (such as a transmission point ID) etc. Specifically, the initialization value $c_{init}$ of the scrambling sequence, which is determined according to the transmission point-specific scrambling initialization operation, is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2 N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment locates, which may be a physical cell ID or a virtual cell ID, where this virtual cell ID may be a virtual cell ID configured by a higher layer signaling.

Embodiment 7

This embodiment provides a method for scrambling sequence configuration. An execution body of this embodiment is a user equipment.

Figure 2:
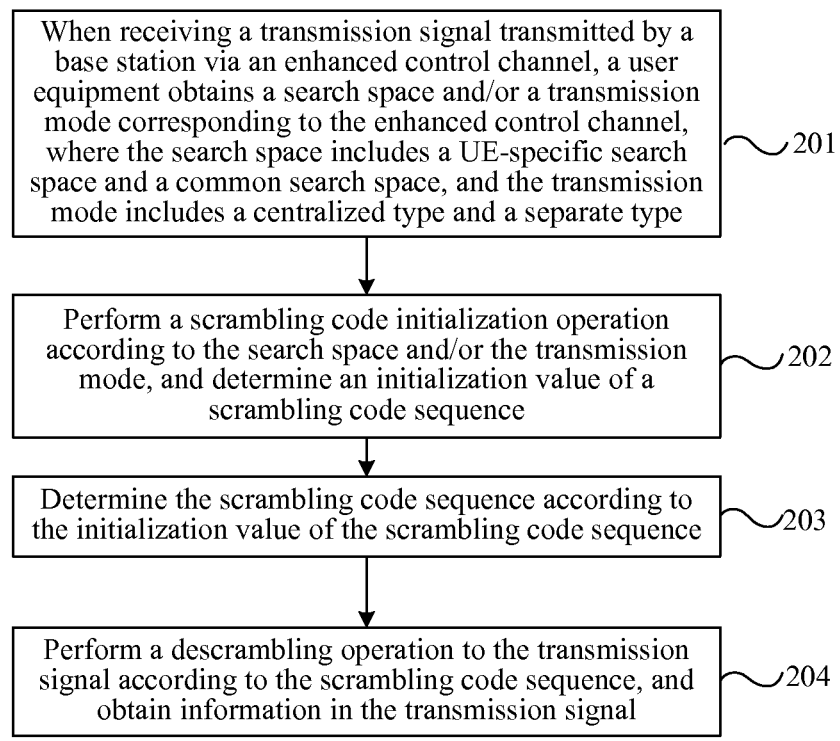
FIG. 2 is a schematic flow chart of a method for scrambling sequence configuration according to another embodiment of the present invention.

FIG. 2 is a schematic flow chart of a method for scrambling sequence configuration according to this embodiment.

Step 201, when receiving a transmission signal transmitted by a base station via an enhanced control channel, a user equipment obtains a search space and/or a transmission mode corresponding to the enhanced control channel, where the search space includes a UE-specific search space and a common search space, and the transmission mode includes a localized mode and a distributed mode.

The process for generating the transmission signal is consistent with the embodiment 1, which will not be repeated herein. The user equipment herein may be a mobile terminal. There are a number of ways for the user equipment to obtain the search space and the transmission mode, for instance, the user equipment obtains the search space via a preset rule or higher layer signaling configuration, and may also obtain the transmission mode via higher layer signaling configuration, and the higher layer signaling herein may be an RRC signaling.

Step 202, perform a scrambling initialization operation according to the search space and/or the transmission mode, and determine an initialization value of a scrambling sequence.

This step is consistent with step 102 in the embodiment 1, which will not be repeated herein.

Step 203, determine the scrambling sequence according to the initialization value of the scrambling sequence.

Step 204, perform a descrambling operation to the transmission signal according to the scrambling sequence, and obtain information in the transmission signal.

Specifically, how the descrambling operation is performed according to the scrambling sequence, and then real information will be obtained.

According to the method for scrambling sequence configuration in this embodiment, a user equipment determines an initialization value of a scrambling sequence according to the search space or the transmission mode, or a terminal determines an initialization value of a scrambling sequence according to both the search space and the transmission mode so as to determine the scrambling sequence, and obtains information in the transmission signal via the scrambling sequence.

Embodiment 8

This embodiment provides a method for scrambling sequence configuration based on the embodiment 7. This embodiment only describes step 202 in details, all other steps are consistent with the embodiment 7, which will not be repeated herein. In this embodiment, an initialization value of a scrambling sequence is determined only based on a search space.

In this embodiment, if the search space is the UE-specific search space, then perform a UE-specific scrambling initialization operation. An initialization value of a scrambling sequence is usually associated with at least one of a certain parameter specific to a user equipment, such as an RNTI, a timeslot number of enhanced control channel transmission and a certain parameter specific to a transmission point, such as a transmission point identification ID, etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the search space is a common search space, then perform a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID) etc. Specifically, the initialization value $c_{init}$ of the scrambling sequence, which is determined according to the transmission point-specific scrambling initialization operation, is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ is an identification assigned by a base station to the user equipment, which corresponds to the associated RNTI when the enhanced control channel transmits information, $n_s$ is the timeslot number, and $N_{ID}^{cell}$ is an identification of a cell where the user equipment locates, which may be a physical cell ID or a virtual cell ID that is configured by a higher layer signaling, and the higher layer signaling herein may be an RRC.

$n_s$ and $N_{ID}^{cell}$ (when corresponding to the physical cell ID) can be obtained immediately after the user equipment completes cell search and interpretation of physical broadcast channel information, the RNTI is obtained after the user equipment gets access to a network randomly, $N_{ID}^{cell}$ (when corresponding to the virtual cell ID) is configured and issued by a higher layer signaling after a random access of the user equipment, and a specific method for obtaining these parameters is the prior art, which will not be repeated herein. The higher layer signaling herein may be RRC.

It should be noted that, there may be the following two options for $N_{ID}^{cell}$: one is that, before or after a random access of the user equipment, $N_{ID}^{cell}$ is a physical cell ID; the other is that, before a random access of the user equipment, $N_{ID}^{cell}$ is a physical cell ID, and after the random access of the user equipment, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 9

This embodiment provides a method for scrambling sequence configuration based on the embodiment 7. This embodiment only describes step 202 in details, all other steps are consistent with the embodiment 7, which will not be repeated herein. In this embodiment, an initialization value of a scrambling sequence is determined only based on a search space.

In this embodiment, if the search space is a UE-specific search space or a common search space, then perform a transmission point-specific initialization operation. Specifically, the initialization value $c_{init}$ of the scrambling sequence, which is determined by the user equipment according to the transmission point-specific initialization operation is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$, where $n_{RNTI}$ corresponds to an associated radio network temporary identifier RNTI during the enhanced control channel transmission, $n_s$ is a timeslot number, and $N_{ID}^{cell}$ is an identification of a cell where the user equipment locates, the identification of the cell may be a physical cell ID or a virtual cell ID, and this virtual cell ID may be a virtual cell ID configured by a higher layer signaling. Obtaining of the parameters above is consistent with the manner of the embodiment 2, which will not be repeated herein.

Different from the embodiment 8, in this embodiment, initialization values of the scrambling sequences for the UE-specific search space and the common search space are the same.

It should be noted that, there may be the following two options for $N_{ID}^{cell}$: one is that, before or after a random access of the user equipment, $N_{ID}^{cell}$ is a physical cell ID; the other is that, before a random access of the user equipment, $N_{ID}^{cell}$ is a physical cell ID, and after the random access of the user equipment, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 10

This embodiment provides a method for scrambling sequence configuration based on the embodiment 7. This embodiment only describes step 202 in details, all other steps are consistent with the embodiment 7, which will not be repeated herein. In this embodiment, an initialization value of a scrambling sequence is determined only based on a transmission mode.

In this embodiment, determining, by a user equipment, an initialization value of a scrambling sequence according to a transmission mode includes:

If the transmission mode is a localized mode, then the user equipment performs a UE-specific scrambling initialization operation. An initialization value of a scrambling sequence is usually associated with at least one of a certain parameter specific to a user equipment (such as an RNTI), a timeslot number of enhanced control channel transmission and a certain parameter specific to a transmission point (such as a transmission point identification ID) etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the transmission mode is a distributed mode, then the user equipment performs a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID) etc. Specifically, the initialization value $c_{init}$ of the scrambling sequence, which is determined according to the transmission point-specific scrambling initialization operation, is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment locates, the identification of the cell may be a physical cell ID or a virtual cell ID, this virtual cell ID may be a virtual cell ID configured by a higher layer signaling.

It should be noted that, there may be the following two options for $N_{ID}^{cell}$: one is that, before or after a random access of the user equipment, $N_{ID}^{cell}$ is a physical cell ID; the other is that, before a random access of the user equipment, $N_{ID}^{cell}$ is a physical cell ID, and after the random access of the user equipment, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 11

This embodiment provides a method for scrambling sequence configuration based on the embodiment 7. This embodiment only describes step 202 in details, all other steps are consistent with the embodiment 7, which will not be repeated herein. In this embodiment, an initialization value of a scrambling sequence is determined only based on a transmission mode.

If the transmission mode is a localized mode or a distributed mode, then a user equipment performs a UE-specific scrambling initialization operation. An initialization value of a scrambling sequence is usually associated with at least one of a certain parameter specific to a user equipment (such as an RNTI), a timeslot number of enhanced control channel transmission and a certain parameter specific to a transmission point (such as a transmission point identification ID) etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the transmission mode is the localized mode or the distributed mode, then the user equipment performs a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID) etc. Specifically, the initialization value $c_{init}$ of the scrambling sequence is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment locates, which may be a physical cell ID or a virtual cell ID of a cell where the user equipment locates, this virtual cell ID may be a virtual cell ID configured by a higher layer signaling.

This embodiment differs from the embodiment 10 in that, whether the transmission mode is the localized mode or the distributed mode, a terminal will use a same initialization value of the scrambling sequence.

Embodiment 12

This embodiment provides a method for scrambling sequence configuration based on the embodiment 7. This embodiment only describes step 202 in details, all other steps are consistent with the embodiment 7, which will not be repeated herein. In this embodiment, an initialization value of a scrambling sequence is determined by a user equipment based on a search space and a transmission mode only.

Optionally, determining, by a user equipment, an initialization value of a scrambling sequence according to a search space and a transmission mode, includes:

If the search space is a UE-specific search space and the transmission mode is a localized mode, then performing a UE-specific scrambling initialization operation. An initialization value of a scrambling sequence is usually associated with at least one of a certain parameter specific to a user equipment (such as an RNTI), a timeslot number of enhanced control channel transmission and a certain parameter specific to a transmission point (such as a transmission point identification ID) etc. Specifically, the initialization value $c_{init}$ of the scrambling sequence is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the search space is the UE-specific search space and the transmission mode is a distributed mode, then performing a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID) etc. Specifically, the initialization value $c_{init}$ of the scrambling sequence is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment locates, which may be a physical cell ID or a virtual cell ID, this virtual cell ID may be a virtual cell ID configured by a higher layer signaling.

Optionally, the determining of the initialization value of the scrambling sequence according to the search space and the transmission mode includes:

If the search space is a common search space and the transmission mode is the localized mode, then performing a UE-specific scrambling initialization operation. An initialization value of a scrambling sequence is usually associated with at least one of a certain parameter specific to a user equipment (such as an RNTI), a timeslot number of enhanced control channel transmission and a certain parameter specific to a transmission point (such as a transmission point identification ID) etc. Specifically, the initialization value $c_{init}$ of the scrambling sequence is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the search space is the common search space and the transmission mode is the distributed mode, then performing a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID) etc. Specifically, the initialization value $c_{init}$ of the scrambling sequence, which is determined according to the transmission point-specific scrambling initialization operation, is $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment locates, which may be a physical cell ID or a virtual cell ID, this virtual cell ID may be a virtual cell ID configured by a higher layer signaling.

Embodiment 13

This embodiment provides a device for scrambling sequence configuration, which is used to execute the method for scrambling sequence configuration in the embodiment 1. The device for scrambling sequence configuration in this embodiment may be integrated in a base station.

Figure 3:
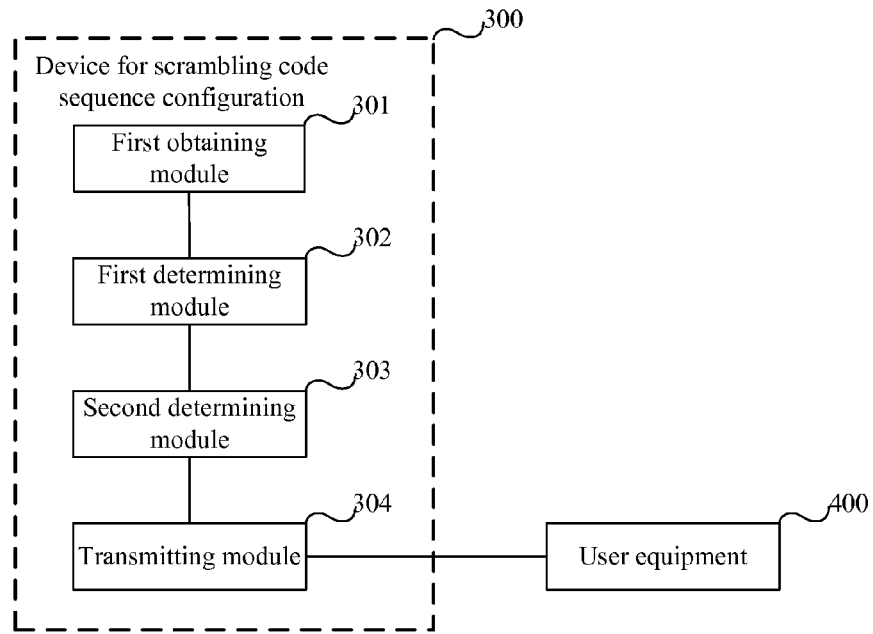
FIG. 3 is a schematic structural diagram of a device for scrambling sequence configuration according to still another embodiment of the present invention.

As shown in FIG. 3 the device 300 for scrambling sequence configuration in this embodiment includes a first obtaining module 301, a first determining module 302, a second determining module 303 and a transmitting module 304.

The first obtaining module 301 is configured to obtain a search space and/or a transmission mode corresponding to an enhanced control channel, where the search space includes a UE-specific search space and a common search space, and the transmission mode includes a localized mode and a distributed mode; the first determining module 302 is configured to perform a scrambling initialization operation according to the search space and/or the transmission mode obtained in the first obtaining module 301, and determine an initialization value of a scrambling sequence. The second determining module 303 is configured to determine the scrambling sequence according to the initialization value of the scrambling sequence determined in the first determining module 302; and the transmitting module 304 is configured to scramble, according to the scrambling sequence determined in the second determining module 303, a transmission signal transmitted by the enhanced control channel and then transmit, so that a user equipment 400 which receives the transmission signal performs a descrambling operation according to the scrambling sequence in the transmission signal.

A operation method of the device 300 for scrambling sequence configuration is consistent with the embodiment 1, which will not be repeated herein.

According to the device 300 for scrambling sequence configuration in this embodiment, an initialization value of a scrambling sequence is determined according to a search space or a transmission mode, or the initialization value of the scrambling sequence is determined according to both the search space and the transmission mode, which is able to guarantee randomization of interferences between different cells or terminals as far as possible, and meanwhile may be used to make a distinction between channels and/or regions where the channels locate.

Embodiment 14

This embodiment further illustrates the first determining module 302 in the embodiment 13; all other modules are consistent with the embodiment 13, which will not be repeated herein.

In this embodiment, the first determining module 302 is specifically configured to:

if the search space is a UE-specific search space, then perform a UE-specific scrambling initialization operation, and determine an initialization value of a scrambling sequence;

if the search space is a common search space, then perform a transmission point-specific scrambling initialization operation, and determine the initialization value of the scrambling sequence.

If the search space is the UE-specific search space, then perform the UE-specific scrambling initialization operation. Generally, an initialization value of a scrambling sequence is associated with at least one of a certain parameter specific to a user equipment 400, such as an RNTI, a timeslot number of enhanced control channel transmission and a certain parameter specific to a transmission point, such as a transmission point identification ID, etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the search space is the common search space, then perform the transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID), etc. Specifically, the initialization value $c_{init}$ of the scrambling sequence, which is determined according to the transmission point-specific scrambling initialization operation, is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ is an identification assigned by the base station to the user equipment 400, which corresponds to the associated RNTI when the enhanced control channel transmits information, $n_s$ is the timeslot number, and $N_{ID}^{cell}$ is an identification of a cell where the user equipment 400 locates, which may be a physical cell ID, or a virtual cell ID that is configured by a higher layer signaling, the higher layer signaling herein may be RRC.

$n_s$ and $N_{ID}^{cell}$ (when corresponding to the physical cell ID) can be obtained immediately after the user equipment 400 completes cell search and interpretation of physical broadcast channel information, the RNTI is obtained after the user equipment 400 gets access to a network randomly, $N_{ID}^{cell}$ (when corresponding to the virtual cell ID) is configured and issued by a higher layer signaling after a random access of the user equipment 400, a specific method for obtaining these parameters is the prior art, which will not be repeated herein. The higher layer signaling herein may be RRC.

It should be noted that, there may be the following two options for $N_{ID}^{cell}$: one is that, before or after a random access of the user equipment 400, $N_{ID}^{cell}$ is a physical cell ID; the other is that, before a random access of the user equipment 400, $N_{ID}^{cell}$ is a physical cell ID, and after the random access of the user equipment 400, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 15

This embodiment further illustrates the first determining module 302 in the embodiment 13; all other modules are consistent with the embodiment 13, which will not be repeated herein.

In this embodiment, the first determining module 302 is specifically configured to:

if the search space is a UE-specific search space or a common search space, then perform a transmission point-specific initialization operation, and determine an initialization value of a scrambling sequence.

In this embodiment, if the search space is the UE-specific search space or the common search space, then perform the transmission point-specific initialization operation. Specifically, the initialization value $c_{init}$ of the scrambling sequence, which is determined according to the transmission point-specific initialization operation is $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$, where $n_{RNTI}$ corresponds to an associated radio network temporary identifier RNTI during enhanced control channel transmission, $n_s$ is a timeslot number, and $N_{ID}^{cell}$ is an identification of a cell where the user equipment 400 locates, the identification of the cell may be a physical cell ID or a virtual cell ID, this virtual cell ID may be a virtual cell ID configured by a higher layer signaling. Obtaining of the parameters above is consistent with the manner of the embodiment 2, which will not be repeated herein.

Different from the embodiment 14, in this embodiment, initialization values of the scrambling sequences for the UE-specific search space and the common search space are the same.

It should be noted that, there may be following two options for $N_{ID}^{cell}$: one is that, before or after a random access of the user equipment, $N_{ID}^{cell}$ is a physical cell ID; the other is that, before a random access of the user equipment 400, $N_{ID}^{cell}$ is a physical cell ID, and after the random access of the user equipment 400, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 16

This embodiment further illustrates the first determining module 302 in the embodiment 13; all other modules are consistent with the embodiment 13, which will not be repeated herein.

In this embodiment, the first determining module 302 is specifically configured to:

if the transmission mode is a localized mode, then perform a UE-specific scrambling initialization operation, and determine an initialization value of a scrambling sequence;

if the transmission mode is a distributed mode, then perform a transmission point-specific scrambling initialization operation, and determine the initialization value of the scrambling sequence.

In this embodiment, the determining of the initialization value of the scrambling sequence by the first determining module 302 according to the transmission mode includes:

If the transmission mode is the localized mode, then the first determining module 302 performs a UE-specific scrambling initialization operation. An initialization value of a scrambling sequence is usually associated with at least one of a certain parameter specific to a user equipment 400 (such as an RNTI), a timeslot number of enhanced control channel transmission and a certain parameter specific to a transmission point (such as a transmission point identification ID), etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the transmission mode is the distributed mode, then the first determining module 302 performs the transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID) etc. Specifically, the initialization value $c_{init}$ of the scrambling sequence, which is determined according to the transmission point-specific scrambling initialization operation, is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment locates, the identification of the cell may be a physical cell ID or a virtual cell ID, this virtual cell ID may be a virtual cell ID configured by a higher layer signaling.

It should be noted that, there may be two following options for $N_{ID}^{cell}$: one is that, before or after a random access of the user equipment 400, $N_{ID}^{cell}$ is a physical cell ID; the other is that, before a random access of the user equipment 400, $N_{ID}^{cell}$ is a physical cell ID, and after the random access of the user equipment 400, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 17

This embodiment further illustrates the first determining module 302 in the embodiment 13; all other modules are consistent with the embodiment 13, which will not be repeated herein.

In this embodiment, the first determining module 302 is specifically configured to:

if the transmission mode is a localized mode or a distributed mode, then perform a UE-specific scrambling initialization operation, and determine an initialization value of a scrambling sequence; or if the transmission mode is the localized mode or the distributed mode, then perform a transmission point-specific scrambling initialization operation, and determine the initialization value of the scrambling sequence.

If the transmission mode is the localized mode or the distributed mode, then the device 300 for scrambling sequence configuration performs the UE-specific scrambling initialization operation. An initialization value of a scrambling sequence is usually associated with at least one of a certain parameter specific to a user equipment 400 (such as an RNTI), a timeslot number of enhanced control channel transmission and a certain parameter specific to a transmission point (such as a transmission point identification ID), etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the transmission mode is the localized mode or the distributed mode, then the device 300 for scrambling sequence configuration performs the transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID), etc. Specifically, the initialization value $c_{init}$ of the scrambling sequence is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment 400 locates, which may be a physical cell ID or a virtual cell ID of a cell where the user equipment locates, this virtual cell ID may be a virtual cell ID configured by a higher layer signaling.

This embodiment differs from the embodiment 3 in that, whether the transmission mode is the localized mode or the distributed mode, the device 300 for scrambling sequence configuration will use a same initialization value of the scrambling sequence.

Embodiment 18

This embodiment further illustrates the first determining module 302 in the embodiment 13; all other modules are consistent with the embodiment 13, which will not be repeated herein.

In this embodiment, the first determining module 302 is specifically configured to:

if the search space is a UE-specific search space and the transmission mode is a localized mode, then perform a UE-specific scrambling initialization operation;

if the search space is the UE-specific search space and the transmission mode is a distributed mode, then perform a transmission point-specific scrambling initialization operation.

Optionally, determining of the initialization value of the scrambling sequence according to the search space and the transmission mode, includes:

If the search space is the UE-specific search space and the transmission mode is the localized mode, then the device 300 for scrambling sequence configuration performs the UE-specific scrambling initialization operation. An initialization value of a scrambling sequence is usually associated with at least one of a certain parameter specific to a user equipment 400 (such as an RNTI), a timeslot number of enhanced control channel transmission and a certain parameter specific to a transmission point (such as a transmission point identification ID), etc. Specifically, the initialization value $c_{init}$ of the scrambling sequence is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the search space is the UE-specific search space and the transmission mode is the distributed mode, then the device 300 for scrambling sequence configuration performs the transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID), etc. Specifically, the initialization value $c_{init}$ of the scrambling sequence is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment 400 locates, which may be a physical cell ID or a virtual cell ID, this virtual cell ID may be a virtual cell ID configured by a higher layer signaling.

Optionally, the determining of the initialization value of the scrambling sequence according to the search space and the transmission mode includes:

If the search space is the common search space and the transmission mode is the localized mode, then performing a UE-specific scrambling initialization operation. An initialization value of a scrambling sequence is usually associated with at least one of a certain parameter specific to a user equipment 400 (such as an RNTI), a timeslot number of enhanced control channel transmission and a certain parameter specific to a transmission point (such as a transmission point identification ID), etc. Specifically, the initialization value $c_{init}$ of the scrambling sequence is $n_{RNTI} \cdot 2^{14} + \lfloor n_s/2 \rfloor \cdot 2^9 + N_{ID}^{cell}$ or $(\lfloor n_s/2 \rfloor + 1) \cdot (2 N_{ID}^{cell} + 1) \cdot 2^{16} + n_{RNTI}$.

If the search space is the common search space and the transmission mode is the distributed mode, then performing a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID), etc. Specifically, the initialization value $c_{init}$ of the scrambling sequence, which is determined according to the transmission point-specific scrambling initialization operation is $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2 N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment 400 locates, which may be a physical cell ID or a virtual cell ID, this virtual cell ID may be a virtual cell ID configured by a higher layer signaling.

Embodiment 19

This embodiment provides a user equipment, which is used to execute the method for scrambling sequence configuration described in the embodiment 7. The user equipment in this embodiment may be a mobile terminal.

Figure 4:
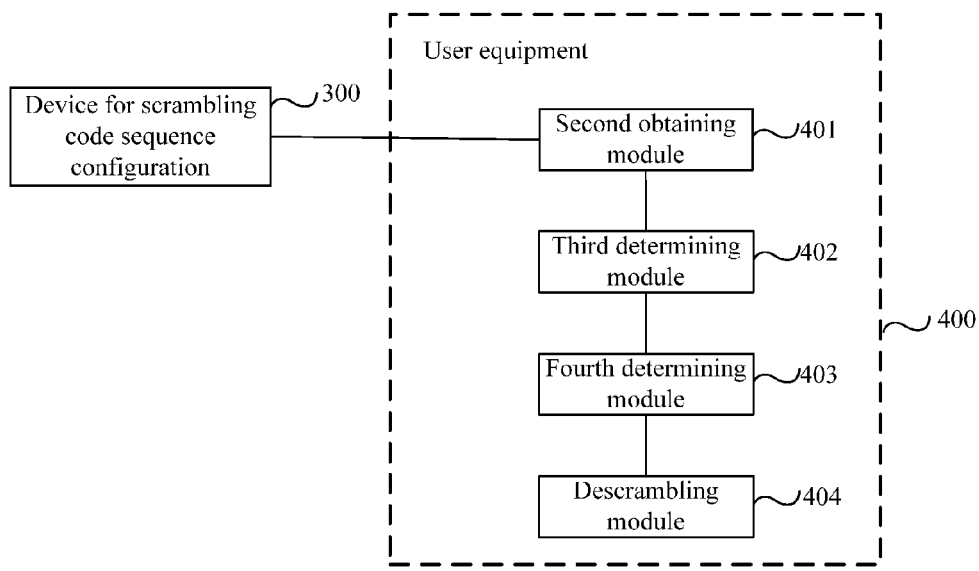
FIG. 4 is a schematic structural diagram of a user equipment according to still another embodiment of the present invention.

FIG. 4 is a schematic structural diagram of a user equipment according to this embodiment. The user equipment 400 includes a second obtaining module 401, a third determining module 402, a fourth determining module 403 and a descrambling module 404.

The second obtaining module 401 is configured to obtain a search space and/or a transmission mode corresponding to an enhanced control channel when the user equipment 400 receives a transmission signal transmitted by a device 300 for scrambling sequence configuration via the enhanced control channel, where the search space includes a UE-specific search space and a common search space, and the transmission mode includes a localized mode and a distributed mode; the third determining module 402 is configured to perform a scrambling initialization operation according to the search space and/or the transmission mode obtained by the second obtaining module 401, and determine an initialization value of a scrambling sequence; the fourth determining module 403 is configured to determine the scrambling sequence according to the initialization value of the scrambling sequence obtained by the third determining module 402; and the descrambling module 404 is configured to perform a descrambling operation to scrambling sequences in the transmission signal according to the scrambling sequence determined by the fourth determining module 403.

A operation method of the user equipment 400 is consistent with the embodiment 7, which will not be repeated herein.

According to the user equipment 400 in this embodiment, the user equipment 400 determines an initialization value of a scrambling sequence according to the search space or the transmission mode, or a terminal determines an initialization value of a scrambling sequence according to both the search space and the transmission mode, so as to determine the scrambling sequence, and obtain information in the transmission signal via the scrambling sequence.

Embodiment 20

This embodiment further illustrates the user equipment in the embodiment 19, and this embodiment merely describes the third determining module 402 in the user equipment 400 in details; all other modules are consistent with the embodiment 19, which will not be repeated herein.

The third determining module 402 in this embodiment is specifically configured to:

if the search space is the UE-specific search space, then perform a UE-specific scrambling initialization operation, and determine an initialization value of a scrambling sequence;

if the search space is the common search space, then perform a transmission point-specific scrambling initialization operation, and determine the initialization value of the scrambling sequence.

In this embodiment, if the search space is the UE-specific search space, then perform a UE-specific scrambling initialization operation. An initialization value of a scrambling sequence is usually associated with at least one of a certain parameter specific to the user equipment 400, such as an RNTI, a timeslot number of enhanced control channel transmission and a certain parameter specific to a transmission point, such as a transmission point identification ID etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2 N_{ID}^{cell} + 1) \cdot 2^{16} + n_{RNTI}$.

If the search space is the common search space, then perform a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID), etc. Specifically, the initialization value $c_{init}$ of the scrambling sequence, which is determined according to the transmission point-specific scrambling initialization operation, is $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2 N_{ID}^{cell} + 1) \cdot 2^{16} + n_{RNTI}$.

Where $n_{RNTI}$ is an identification assigned by a base station to the user equipment 400, which corresponds to the associated RNTI when the enhanced control channel transmits information, $n_s$ is the timeslot number, and $N_{ID}^{cell}$ is an identification of a cell where the user equipment 400 locates, which may be a physical cell ID or a virtual cell ID configured by a higher layer signaling, the higher layer signaling herein may be RRC.

$n_s$ and $N_{ID}^{cell}$ (when corresponding to the physical cell ID) can be obtained immediately after the user equipment 400 completes cell search and interpretation of physical broadcast channel information, the RNTI is obtained after the user equipment 400 gets access to a network randomly, $N_{ID}^{cell}$ (when corresponding to the virtual cell ID) is configured and issued by a higher layer signaling after a random access of the user equipment 400, a specific method for obtaining these parameters is the prior art, which will not be repeated herein. The higher layer signaling herein may be RRC.

It should be noted that, there may be two following options for $N_{ID}^{cell}$: one is that, before or after a random access of the user equipment 400, $N_{ID}^{cell}$ is a physical cell ID; the other is that, before a random access of the user equipment 400, $N_{ID}^{cell}$ is a physical cell ID, and after the random access of the user equipment 400, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 21

This embodiment further illustrates the user equipment in the embodiment 19, and this embodiment merely describes the third determining module 402 in the user equipment 400 in details; all other modules are consistent with the embodiment 19, which will not be repeated herein.

In this embodiment, the third determining module 402 is specifically configured to:

if the search space is a UE-specific search space or a common search space, then perform a transmission point-specific initialization operation, and determine an initialization value of a scrambling sequence.

In this embodiment, if the search space is the UE-specific search space or the common search space, then perform the transmission point-specific initialization operation. Specifically, the initialization value $c_{init}$ of the scrambling sequence, which is determined by the user equipment 400 according to the transmission point-specific initialization operation is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$, where, $n_{RNTI}$ corresponds to an associated radio network temporary identifier RNTI during enhanced control channel transmission, $n_s$ is a timeslot number, and $N_{ID}^{cell}$ is an identification of a cell where the user equipment 400 locates, the identification of the cell may be a physical cell ID or a virtual cell ID, this virtual cell ID may be a virtual cell ID configured by a higher layer signaling. Obtaining of the parameters above is consistent with the manner of the embodiment 2, which will not be repeated herein.

Different from the embodiment 8, in this embodiment, initialization values of the scrambling sequences for the UE-specific search space and the common search space are the same.

It should be noted that, there may be two following options for in $N_{ID}^{cell}$: one is that, before or after a random access of the user equipment 400, $N_{ID}^{cell}$ is a physical cell ID; the other is that, before a random access of the user equipment 400, $N_{ID}^{cell}$ is a physical cell ID, and after the random access of the user equipment 400, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 22

This embodiment further illustrates the user equipment in the embodiment 19, and this embodiment merely describes the third determining module 402 in the user equipment 400 in details; all other modules are consistent with the embodiment 19, which will not be repeated herein.

In this embodiment, the third determining module 402 is specifically configured to:

if the transmission mode is a localized mode, then perform a UE-specific scrambling initialization operation, and determine an initialization value of a scrambling sequence;

if the transmission mode is a distributed mode, then perform a transmission point-specific scrambling initialization operation, and determine the initialization value of the scrambling sequence.

If the transmission mode is the localized mode, then the user equipment 400 performs the UE-specific scrambling initialization operation. An initialization value of a scrambling sequence is usually associated with at least one of a certain parameter specific to the user equipment 400 (such as an RNTI), a timeslot number of enhanced control channel transmission and a certain parameter specific to a transmission point (such as a transmission point identification ID) etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the transmission mode is the distributed mode, then the user equipment 400 performs the transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID) etc. Specifically, the initialization value $c_{init}$ of the scrambling sequence, which is determined according to the transmission point-specific scrambling initialization operation, is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment 400 locates, the identification of the cell may be a physical cell ID or a virtual cell ID, this virtual cell ID may be a virtual cell ID configured by a higher layer signaling.

It should be noted that, there may be two following options for $N_{ID}^{cell}$: one is that, before or after a random access of the user equipment 400, $N_{ID}^{cell}$ is a physical cell ID; the other is that, before a random access of the user equipment 400, $N_{ID}^{cell}$ is a physical cell ID, and after the random access of the user equipment 400, $N_{ID}^{cell}$ is a virtual cell ID, this virtual cell ID may be the same as a virtual cell ID during initialization of a DMRS scrambling sequence of a PDSCH, and may also be the same as a virtual cell ID of a DMRS scrambling sequence of the enhanced control channel, and additionally, may also be a value which is configured by a higher layer signaling semi-statically or dynamically and is dedicated for the enhanced control channel, details will not be repeated herein.

Embodiment 23

This embodiment further illustrates the user equipment in the embodiment 19, and this embodiment merely describes the third determining module 402 in the user equipment 400 in details; all other modules are consistent with the embodiment 19, which will not be repeated herein.

In this embodiment, the third determining module 402 is specifically configured to:

if the transmission mode is a localized mode or a distributed mode, then perform a UE-specific scrambling initialization operation, and determine an initialization value of a scrambling sequence; or if the transmission mode is the localized mode or the distributed mode, then perform a transmission point-specific scrambling initialization operation, and determine the initialization value of the scrambling sequence.

If the transmission mode is the localized mode or the distributed mode, then the user equipment 400 performs the UE-specific scrambling initialization operation. An initialization value of a scrambling sequence is usually associated with at least one of a certain parameter specific to the user equipment 400 (such as an RNTI), a timeslot number of enhanced control channel transmission and a certain parameter specific to a transmission point (such as a transmission point identification ID), etc. Specifically, the initialization value $c_{init}$ of the scrambling sequence, which is determined according to the UE-specific scrambling initialization operation, is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the transmission mode is the localized mode or the distributed mode, then the user equipment 400 performs the transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID), etc. Specifically, the initialization value $c_{init}$ of the scrambling sequence is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment 400 locates, which may be a physical cell ID or a virtual cell ID of a cell where the user equipment locates, this virtual cell ID may be a virtual cell ID configured by a higher layer signaling.

This embodiment differs from the embodiment 22 in that, whether the transmission mode is the localized mode or the distributed mode, a terminal will use a same initialization value of the scrambling sequence.

Embodiment 24

This embodiment further illustrates the user equipment in the embodiment 19, and this embodiment merely describes the third determining module 402 in the user equipment 400 in details; all other modules are consistent with the embodiment 19, which will not be repeated herein.

In this embodiment, the third determining module 402 is specifically configured to:

if the search space is a UE-specific search space and the transmission mode is a localized mode, then perform a UE-specific scrambling initialization operation;

if the search space is the UE-specific search space and the transmission mode is a distributed mode, then perform a transmission point-specific scrambling initialization operation.

Or, the third determining module 402 is specifically configured to:

if the search space is a common search space and the transmission mode is the localized mode, then perform a UE-specific scrambling initialization operation;

if the search space is the common search space and the transmission mode is the distributed mode, then perform a transmission point-specific scrambling initialization operation.

Optionally, the determining of the initialization value of the scrambling sequence by the user equipment 400 according to the search space and the transmission mode includes:

If the search space is the UE-specific search space and the transmission mode is the localized mode, then performing a UE-specific scrambling initialization operation. An initialization value of a scrambling sequence is usually associated with at least one of a certain parameter specific to the user equipment 400 (such as an RNTI), a timeslot number of enhanced control channel transmission and a certain parameter specific to a transmission point (such as a transmission point identification ID), etc. Specifically, the initialization value of the scrambling sequence is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the search space is the UE-specific search space and the transmission mode is the distributed mode, then performing a transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID), etc. Specifically, the initialization value $c_{init}$ of the scrambling sequence is $\lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment 400 locates, which may be a physical cell ID or a virtual cell ID, this virtual cell ID may be a virtual cell ID configured by a higher layer signaling.

Optionally, the determining of the initialization value of the scrambling sequence according to the search space and the transmission mode includes:

If the search space is the common search space and the transmission mode is the localized mode, then performing the UE-specific scrambling initialization operation. An initialization value of a scrambling sequence is usually associated with at least one of a certain parameter specific to the user equipment 400 (such as an RNTI), a timeslot number of enhanced control channel transmission and a certain parameter specific to a transmission point (such as a transmission point identification ID), etc. Specifically, the initialization value $c_{init}$ of the scrambling sequence is $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

If the search space is the common search space and the transmission mode is the distributed mode, then performing the transmission point-specific scrambling initialization operation. An initialization value of a scrambling sequence is usually associated with at least one of a timeslot number of enhanced control channel transmission, an associated RNTI during the enhanced control channel transmission and a certain parameter specific to a transmission point (such as a transmission point ID), etc. Specifically, the initialization value $c_{init}$ of the scrambling sequence, which is determined according to the transmission point-specific scrambling initialization operation, is $\lfloor n_s/2 \rfloor 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$.

Where $n_{RNTI}$ corresponds to the associated RNTI during the enhanced control channel transmission, $n_s$ is the timeslot number, and $N_{ID}^{cell}$ is an identification of a cell where the user equipment 400 locates, which may be a physical cell ID or a virtual cell ID, this virtual cell ID may be a virtual cell ID configured by a higher layer signaling.

Embodiment 25

This embodiment provides a base station, which is used to execute the method for scrambling sequence configuration in the embodiment 1.

The base station in this embodiment includes: at least one processor and a memory, where the memory is configured to store an executable program code, and, by reading the executable program code stored in the memory to run a program corresponding to the executable program code, the processor is configured to:

obtain a search space and/or a transmission mode corresponding to an enhanced control channel, where the search space includes a UE-specific search space and a common search space, and the transmission mode includes a localized mode and a distributed mode;

perform a scrambling initialization operation according to the search space and/or the transmission mode, and determine an initialization value of a scrambling sequence.

The base station of this embodiment determines an initialization value of a scrambling sequence according to a search space or a transmission mode, or the base station determines the initialization value of the scrambling sequence according to both the search space and the transmission mode, which is able to guarantee randomization of interferences between different cells or terminals as far as possible, and meanwhile may be used to make a distinction between channels and/or regions where the channels locate.

Embodiment 26

This embodiment provides a user equipment, which is used to execute the method for scrambling sequence configuration in the embodiment 7.

The user equipment of this embodiment includes: at least one processor and a memory, where the memory is configured to store an executable program code, and by reading the executable program code stored in the memory to run a program corresponding to the executable program code, the processor is configured to:

when the user equipment receives a transmission signal transmitted by a base station via an enhanced control channel, obtain a search space and/or a transmission mode corresponding to the enhanced control channel, where the search space includes a UE-specific search space and a common search space, and the transmission mode includes a localized mode and a distributed mode;

perform a scrambling initialization operation according to the search space and/or the transmission mode, and determine an initialization value of a scrambling sequence;

determine the scrambling sequence according to the initialization value of the scrambling sequence; and perform a descrambling operation to a scrambling sequence in the transmission signal according to the scrambling sequence.

The user equipment of this embodiment determines an initialization value of a scrambling sequence according to a search space or a transmission mode, or a terminal determines an initialization value of a scrambling sequence according to both the search space and the transmission mode, so as to determine the scrambling sequence and obtain information in the transmission signal via the scrambling sequence.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are executed. The foregoing storage medium includes various mediums capable of storing program codes, such as an ROM, an RAM, a magnetic disk, or an optical disc etc.

Finally, it should be noted that the foregoing embodiments are merely intended for describing technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof; however, these modifications or replacements do not make the essence of corresponding technical solutions depart from the scope of the technical solutions in the embodiments of the present invention.

What is claimed is:

1. A method for scrambling sequence configuration, comprising:

obtaining, by a base station, a search space and a transmission mode corresponding to an enhanced control channel, wherein the search space comprises a user equipment specific (UE-specific) search space and a common search space, and the transmission mode comprises a localized mode and a distributed mode;

performing, by the base station, a scrambling initialization operation according to the search space and the transmission mode, and determining an initialization value of a scrambling sequence;

determining, by the base station, according to the initialization value of the scrambling sequence, the scrambling sequence; and scrambling, by the base station, according to the scrambling sequence, a transmission signal transmitted by a transmitter utilizing the enhanced control channel and then transmitting to a user equipment (UE), so that the user equipment which receives the transmission signal performs a descrambling operation according to the scrambling sequence in the transmission signal.

2. The method for scrambling sequence configuration according to claim 1, wherein the performing of the scrambling initialization operation according to the search space and the transmission mode comprises the processor making a decision of:

if the search space is the UE-specific search space or the common search space, then performing a transmission point-specific initialization operation.

3. The method for scrambling sequence configuration according to claim 2, wherein the determining according to the initialization value of a scrambling sequence comprises:

determining, according to the transmission point-specific scrambling initialization operation, the initialization value of the scrambling sequence as $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;

wherein $n_{RNTI}$ corresponds to an associated radio network temporary identifier (RNTI) during enhanced control channel transmission, $n_s$ is a timeslot number, and $N_{ID}^{cell}$ is a physical cell identity (ID) or a virtual cell ID of a cell where the user equipment locates.

4. The method for scrambling sequence configuration according to claim 3, wherein the virtual cell ID is a virtual cell ID in initialization setting of a demodulation reference signal (DMRS) sequence of the enhanced control channel, or is a virtual cell ID in initialization setting of a DMRS sequence of a physical downlink shared channel, or is other value that is configured by a higher layer signaling and is dedicated for the enhanced control channel.

5. The method for scrambling sequence configuration according to claim 1, wherein the performing of the scrambling initialization operation according to the search space and the transmission mode comprises the processor making a decision of:
   if the transmission mode is the localized mode, then performing a UE-specific scrambling initialization operation.

6. The method for scrambling sequence configuration according to claim 5, wherein the determining according to the initialization value of a scrambling sequence comprises:
   determining, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;
   wherein $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

7. The method for scrambling sequence configuration according to claim 6, wherein the virtual cell ID is a virtual cell ID in initialization setting of a DMRS sequence of the enhanced control channel, or is a virtual cell ID in initialization setting of a DMRS sequence of a physical downlink shared channel, or is other value that is configured by a higher layer signaling and is dedicated for the enhanced control channel.

8. The method for scrambling sequence configuration according to claim 1, wherein the performing of the scrambling initialization operation according to the search space and the transmission mode comprises the processor making a decision of:
   if the transmission mode is the distributed mode, then performing a transmission point-specific scrambling initialization operation.

9. The method for scrambling sequence configuration according to claim 8, wherein the determining according to the initialization value of a scrambling sequence comprises:
   determining, according to the transmission point-specific scrambling initialization operation, the initialization value of the scrambling sequence as $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;
   wherein $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

10. The method for scrambling sequence configuration according to claim 9, wherein the virtual cell ID is a virtual cell ID in initialization setting of a DMRS sequence of the enhanced control channel, or is a virtual cell ID in initialization setting of a DMRS sequence of a physical downlink shared channel, or is other value that is configured by a higher layer signaling and is dedicated for the enhanced control channel.

11. A base station, comprising at least one processor and a memory, wherein the memory is configured to store an executable program code, and the processor, by reading the executable program code stored in the memory to run a program corresponding to the executable program code, is configured to:
   obtain a search space and a transmission mode corresponding to an enhanced control channel, wherein the search space comprises a user equipment specific (UE-specific) search space and a common search space, and the transmission mode comprises a localized mode and a distributed mode;
   perform a scrambling initialization operation according to the search space and the transmission mode, and determine an initialization value of a scrambling sequence;
   determine, according to the initialization value of the scrambling sequence, the scrambling sequence; and
   scramble, according to the scrambling sequence, a transmission signal transmitted by a transmitter, utilizing the enhanced control channel and then transmit to a user equipment (UE), so that the user equipment which receives the transmission signal performs a descrambling operation according to the scrambling sequence in the transmission signal.

12. The base station according to claim 11, wherein the processor is further configured to:
   if the search space is the UE-specific search space or the common search space, then perform a transmission point-specific initialization operation.

13. The base station according to claim 12, wherein the processor is further configured to:
   determine, according to the transmission point-specific scrambling initialization operation, the initialization value of the scrambling sequence as $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;
   wherein $n_{RNTI}$ corresponds to an associated radio network temporary identifier (RNTI) during enhanced control channel transmission, $n_s$ is a timeslot number, and $N_{ID}^{cell}$ is a physical cell identity (ID) or a virtual cell ID of a cell where the user equipment locates.

14. The base station according to claim 13, wherein the virtual cell ID is a virtual cell ID in initialization setting of a demodulation reference signal (DMRS) sequence of the enhanced control channel, or is a virtual cell ID in initialization setting of a DMRS sequence of a physical downlink shared channel, or is other value that is configured by a higher layer signaling and is dedicated for the enhanced control channel.

15. The base station according to claim 11, wherein the processor is further configured to:
   if the transmission mode is the localized mode, then perform a UE-specific scrambling initialization operation.

16. The base station according to claim 15, wherein the processor is further configured to:
   determine, according to the UE-specific scrambling initialization operation, the initialization value of the scrambling sequence as $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;
   wherein $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

17. The base station according to claim 16, wherein the virtual cell ID is a virtual cell ID in initialization setting of a DMRS sequence of the enhanced control channel, or is a virtual cell ID in initialization setting of a DMRS sequence of a physical downlink shared channel, or is other value that is configured by a higher layer signaling and is dedicated for the enhanced control channel.

18. The base station according to claim 11, wherein the processor is further configured to:
if the transmission mode is the distributed mode, then perform a transmission point-specific scrambling initialization operation.

19. The base station according to claim 18, wherein the processor is further configured to:
determine, according to the transmission point-specific scrambling initialization operation, the initialization value of the scrambling sequence as $\lfloor n_s/2 \rfloor \cdot 2^9 + N_{ID}^{cell}$, $n_{RNTI} \cdot 2^{14} + \lfloor n_s/2 \rfloor \cdot 2^9 + N_{ID}^{cell}$ or $(\lfloor n_s/2 \rfloor + 1) \cdot (2N_{ID}^{cell} + 1) \cdot 2^{16} + n_{RNTI}$;
wherein $n_{RNTI}$ corresponds to an associated RNTI during enhanced control channel transmission, $n_s$ is a timeslot number, and $N_{ID}^{cell}$ is a physical cell ID or a virtual cell ID of a cell where the user equipment locates.

20. The base station according to claim 19, wherein the virtual cell ID is a virtual cell ID in initialization setting of a DMRS sequence of the enhanced control channel, or is a virtual cell ID in initialization setting of a DMRS sequence of a physical downlink shared channel, or is other value that is configured by a higher layer signaling and is dedicated for the enhanced control channel.

* * * * *